(12) United States Patent
Stojanovski

(10) Patent No.: US 9,545,678 B2
(45) Date of Patent: Jan. 17, 2017

(54) ROTARY CUTTING TOOL

(71) Applicant: Stojan Stojanovski, Shelby Township, MI (US)

(72) Inventor: Stojan Stojanovski, Shelby Township, MI (US)

( * ) Notice: Subject to any disclaimer, the term of this patent is extended or adjusted under 35 U.S.C. 154(b) by 372 days.

(21) Appl. No.: 14/078,862

(22) Filed: Nov. 13, 2013

(65) Prior Publication Data

US 2014/0140780 A1 May 22, 2014

Related U.S. Application Data

(60) Provisional application No. 61/727,446, filed on Nov. 16, 2012.

(51) Int. Cl.
   *B23C 5/10* (2006.01)
   *B23C 5/00* (2006.01)

(52) U.S. Cl.
   CPC .............. *B23C 5/10* (2013.01); *B23C 5/1009* (2013.01); *B23C 2210/02* (2013.01); *B23C 2210/0485* (2013.01); *B23C 2210/086* (2013.01); *B23C 2210/206* (2013.01); *B23C 2210/40* (2013.01); *B23C 2210/486* (2013.01); *B23C 2210/54* (2013.01); *B23C 2226/61* (2013.01); *B23C 2226/62* (2013.01); *Y10T 407/1962* (2015.01)

(58) Field of Classification Search
   CPC . B23C 5/10; Y10T 407/1958; Y10T 407/1966
   See application file for complete search history.

(56) References Cited

U.S. PATENT DOCUMENTS

| | | | | |
|---|---|---|---|---|
| 3,548,476 A | * | 12/1970 | Cave | B23C 5/10 407/54 |
| 3,775,819 A | * | 12/1973 | Ribich | B23C 5/10 407/53 |
| 4,174,915 A | * | 11/1979 | Peetz | B23C 5/10 407/59 |
| 4,212,568 A | * | 7/1980 | Minicozzi | B23C 5/10 407/53 |
| 4,285,618 A | | 8/1981 | Shanley, Jr. | |
| 4,497,600 A | * | 2/1985 | Kishimoto | B23C 5/10 407/53 |
| 4,560,308 A | * | 12/1985 | Deller | B23C 5/10 407/53 |
| 4,770,567 A | * | 9/1988 | Moriarty | B23C 3/36 407/59 |
| 4,810,136 A | | 3/1989 | Paige | |
| 5,190,420 A | | 3/1993 | Kishimoto et al. | |

(Continued)

OTHER PUBLICATIONS

Office Action including restriction requirement issued in related application CA2832781.

*Primary Examiner* — Will Fridie, Jr.
(74) *Attorney, Agent, or Firm* — Vincent Re PLLC

(57) ABSTRACT

A cutting tool having particular usefulness in milling fall includes a plurality of flutes wherein each flute includes a plurality of reliefs spaced equidistant along a leading cutting wall or edge and a second plurality of reliefs spaced equidistant along a trailing cutting wall or edge and wherein the second plurality of reliefs are off set evenly from the first plurality of reliefs. The plurality of reliefs on a second flute are offset from the plurality of reliefs on a first flute by a distance equal to the equidistance of the plurality of reliefs divided by the total number of flutes.

6 Claims, 3 Drawing Sheets

(56) References Cited

U.S. PATENT DOCUMENTS

| | | | |
|---|---|---|---|
| 6,007,026 A | 12/1999 | Shorey | |
| 6,234,725 B1 | 5/2001 | Campian | |
| 7,399,147 B1 * | 7/2008 | VanDyke, Jr. | B23C 5/003 407/53 |
| 7,563,059 B2 * | 7/2009 | Song | B23C 5/10 407/53 |
| 8,047,747 B2 * | 11/2011 | Flynn | B23C 5/003 407/53 |

* cited by examiner

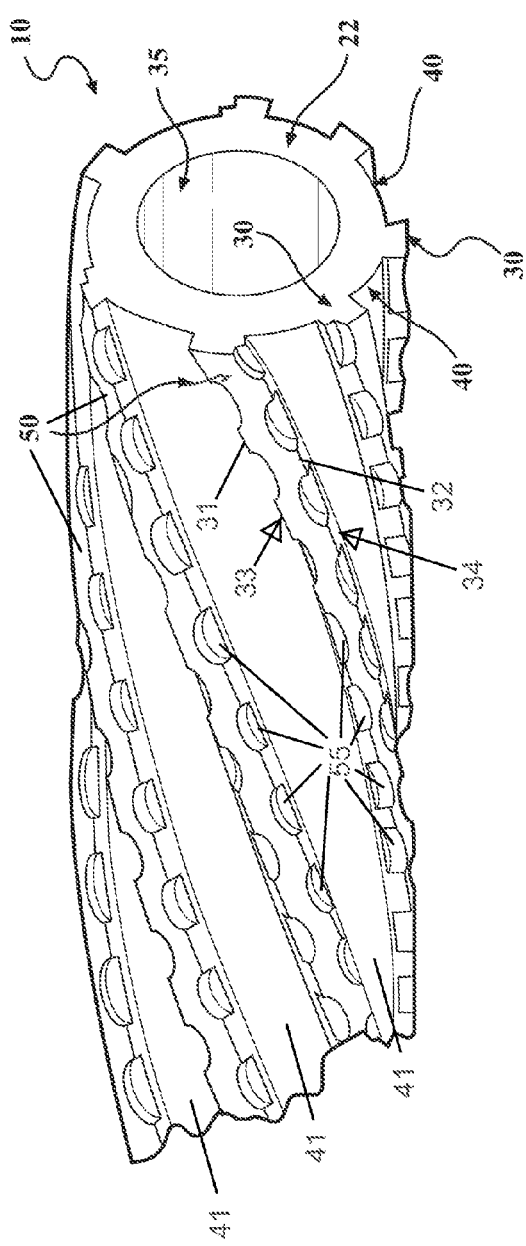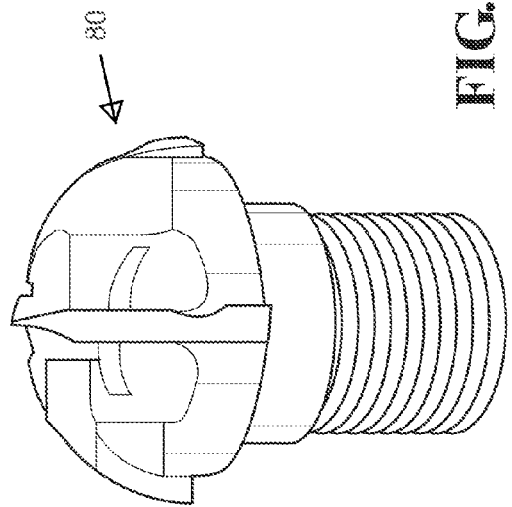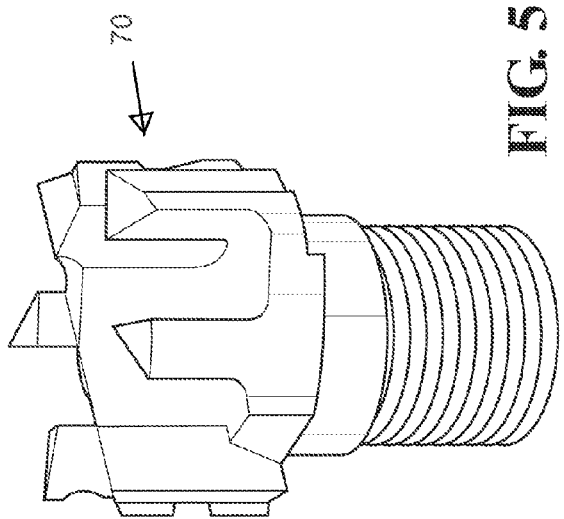

ROTARY CUTTING TOOL

CROSS-REFERENCE TO RELATED APPLICATIONS

This application claims priority to U.S. Provisional Patent Application No. 61/727,446, filed Nov. 16, 2012, in the name of Stojanovski and entitled Rotary Cutting Tool, the entire contents of which are incorporated herein by reference for all purposes.

FIELD

The present disclosure relates generally to an improved rotary cutting tool. More particularly, the present disclosure relates to an improved rotary cutting tool for use in milling a workpiece made from a foam material.

DISCUSSION OF RELATED ART

Rotary cutting tools, including milling tools, can be used for various machining operations on workpieces. Such machine operations can be generically referred to as milling operations and include the forming of slots, keyways, pockets, and the like, along with the removal of material to achieve a net location of the material for a finished product. Several considerations related to end-mill tool design include time for completing a machining operation, amount of material removed in a cut, quality of the cut, and wear on the tool itself during the milling operation.

The various machining operations performed with a rotary cutting tool can be performed in a "roughing" mode (rough cutting) and a "finishing" mode (finish cutting). During roughing, material is removed from a workpiece at a relatively high rate (e.g., depth of cut), but with a relatively rough surface finish. Finish cutting involves the removal of material from a workpiece at a relatively low rate, but with a relatively smooth surface finish. Generally, these two operations (roughing and finishing) are antithetical to one another, and commonly require two operations with two different cutting tools.

Rotary cutting tools can be commonly formed from materials such as tungsten carbide, high speed steel, ceramic, and other advanced materials and coatings and typically include a "shank" portion, a "body" portion and a "point". The shank portion is located towards one (proximal or first) end of the tool and is generally cylindrical (and may be tapered) for engagement by a spindle of a milling machine. In use, the milling machine rotatably drives the tool about its longitudinal axis. The main or body portion of the tool is located between the shank and the opposite (distal or second) end or point. The point is formed at an opposite end of the tool from the shank portion, and typically includes one or more cutting edges. To manufacture an end-mill tool, a grinder is typically used to grind a flute face and a corresponding cutting edge on the body of the end-mill tool. The grind (grinding operation) typically starts from a position adjacent an end of the body portion and continues to a point at or near the interface of the body portion and the shank portion, commonly referred to as an "inception location". The grind forms a desired helical flute grove and associated helical flute face and/or helical cutting edge. Cutting tools are known in the art and several examples are disclosed in U.S. Pat. No. 6,007,026, to Shorey; U.S. Pat. No. 5,190,420, to Kishimoto et al.; U.S. Pat. No. 4,810,136, to Paige; U.S. Pat. No. 4,285,618, to Shanley, Jr.; and U.S. Pat. No. 6,234,725 to Campian, the entire contents of which are incorporated herein by reference for all purposes. The known tools have continuous helical flutes with continuous cutting edges.

Generally it is known to use a rotary cutting tool to mill various types of materials. However, some materials are generally known to be much more challenging to perform roughing and finishing cutting processes thereon due to the unique characteristics of the particular material. For quite some time there remains a significant challenge to develop a cutting tool for use in the roughing and finishing of foam and/or polymeric molded materials. The cutting or milling of a foam and/or polymeric molded material can be particularly challenging because the material is relatively pliable and the cutting of the material can cause the workpiece to stretch or move significantly as the material is being cut away. This can lead to adverse results in the cutting process and the failure of the workpiece to achieve the desired net result. Further, the processing of the chips from the material is more challenging due to the relatively pliable nature of the material and can lead to clogging of the chips in the cutting tool further adversely affecting the cutting operation of the foam. Despite the long felt need for a cutting tool that can perform roughing and finishing cutting on foam in a more efficient and effective manner, no such cutting tools is known. It would still be desirable to provide an improved rotary cutting tool having greater cutting efficiency, particularly across the entire cutting length of the tool. It would also still be desirable to provide an improved rotary cutting tool without excess cut material build up on the tool.

SUMMARY

In one exemplary embodiment of the present disclosure there is disclosed and taught a cutting tool having a body having a longitudinal axis, a proximal end and a distal end; and a first flute having a leading wall and a trailing wall, the first flute further including a surface extending at least partially between the leading wall and the trailing wall, the surface having a first cutting edge located proximal the leading wall and a second cutting-edge located proximal the trailing wall.

In one exemplary embodiment of the present disclosure there is disclosed and taught a rotatable cutting tool according to the present disclosure. In one exemplary embodiment of the present disclosure there is disclosed and taught a rotatable cutting tool including an elongate body having a longitudinal axis, a proximal end and a distal end; a first helical flute groove extending over a length of the elongate body, the first helical flute groove having a first end and a second end, the first helical flute groove having a leading wall having an edge and a trailing wall having an edge; a second helical flute groove extending over a length of the elongate body, the second helical flute groove having a first end and a second end, the second helical flute groove having a leading wall having an edge and a trailing wall having an edge; wherein the first and second helical flute grooves defining a helical flute having a helical flute surface having a projecting edge; and wherein the leading wall of the second helical flute groove is curvilinear.

BRIEF DESCRIPTION OF THE DRAWINGS

FIG. 4 is a partial, perspective graphic image view of the distal end of the cutting tool of FIG. 1 show further showing the details of the flutes according to the exemplary embodiment of the present disclosure.

FIG. 5 is a perspective graphic image view of a first mill end tool for coupling to the distal end of the cutting tool of FIG. 1 according to the exemplary embodiment of the present disclosure.

FIG. 6 is a perspective graphic image view of a second mill end tool for coupling to the distal end of the cutting tool of FIG. 1 according to the exemplary embodiment of the present disclosure.

DETAILED DESCRIPTION

Figure 1:
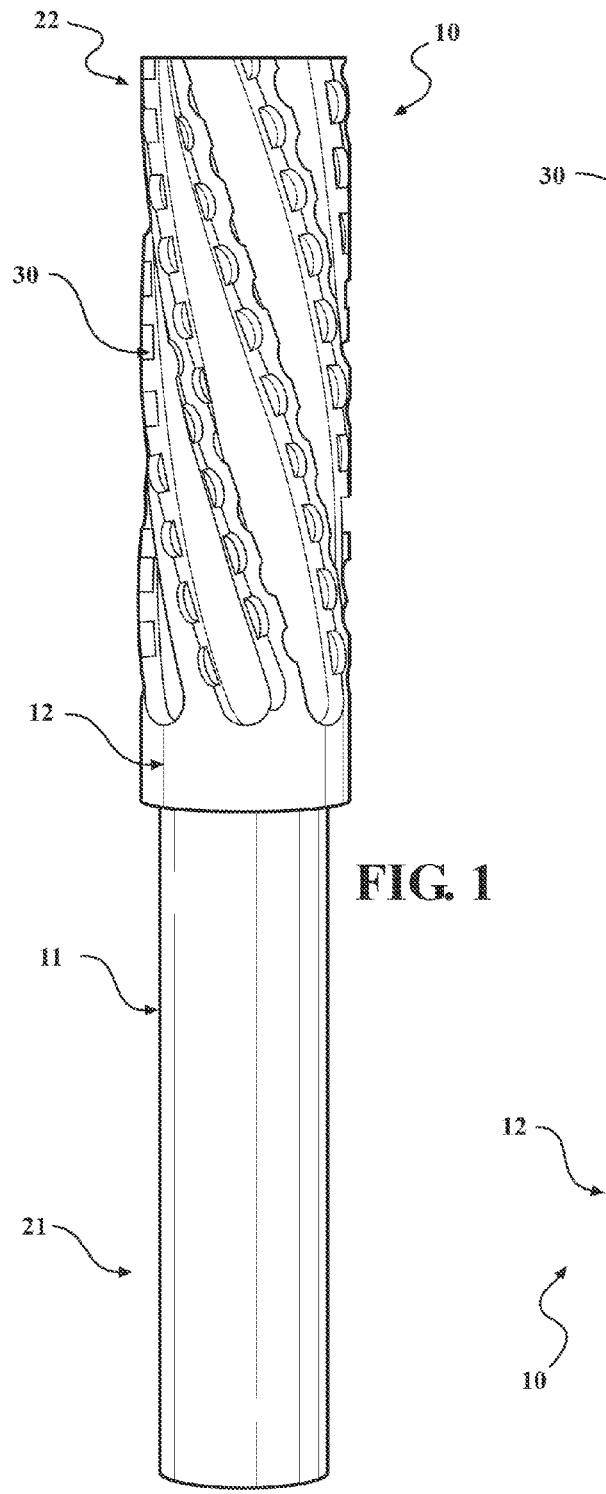
FIG. 1 is a graphic side image view of an exemplary embodiment of a cutting tool according to the present disclosure.

Referring in general to all of the Figures and in particular to FIG. 1, the present disclosure and teachings described herein relate to a cutting tool 10 having particular application in the use of milling a foam material such as may be used for a vehicle seat foam pad or the like. The cutting tool 10 has particular efficiency and effectiveness when used in milling a foam material composed of polyurethane foam or similar material. Such known materials have particular application in a variety of industries and products, including in particular, the automotive industry for producing a sample part, such as an engine component or the like (i.e., workpiece). While the present disclosure is done in reference to the workpiece being formed from a polymeric block of material for use as an engine block for use in a vehicle, this is only done by way of example and is not intended to be limiting in any manner. The rotary cutting tool 10 disclosed herein may be used in the milling of foam and/or polymeric or similar type foam castings and plastic molded workpieces for use in any appropriate known or future applications.

Figure 2:
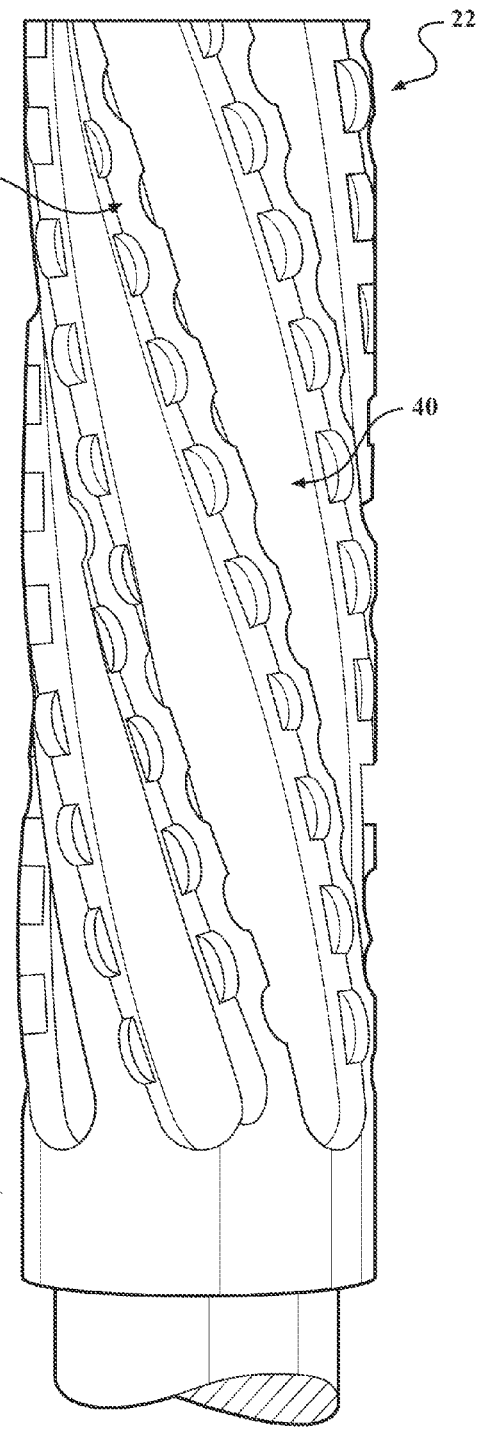
FIG. 2 is a partial graphic image view of the exemplary embodiment of the cutting tool of FIG. 1 according to the present disclosure.

Referring in particular to FIG. 1, there is disclosed a cutting tool 10 including a shank portion 11 and a body portion 12. The cutting tool 10 may be formed from a blank of generally cylindrical stock and may be formed, machined or otherwise made into the final shape as shown. In one particular exemplary embodiment, the blank from which the cutting tool 10 is made includes a first portion having a smaller outer diameter portion and a second portion having a larger diameter. The cutting tool 10 includes a first or proximal end 21 and a second or distal end 22. The cutting tool 10 has a generally elongate shape including a longitudinal axis about which the cutting tool 10 may be rotated to perform a milling operation on a workpiece (not shown). The cutting tool 10 may include a plurality of flutes 30 having a generally helical shape and extending over an axial extent of the body portion 12 as best shown in FIG. 2. The flutes 30 may extend over as little or as much of the body portion 12 as may be desired or appropriate for a given application.

In the exemplary embodiment of the cutting tool 10 illustrated in the Figures, the cutting tool 10 includes a shank portion 11 and a body portion 12 extending in a longitudinal direction away from the shank portion 11 and together defining a longitudinal axis of the cutting tool 11. The cutting tool 10 is formed to include a plurality of flutes 30 extending along the body portion 12. The flutes 30 may be generally formed, such as by grinding two channels or sides of a flute groove 40 located between two flutes 30 of the cutting tool 10. The flute groove is defined by two opposing walls 33 and 34 along the flute groove 40 which are either a leading wall 33 or trailing wall 34 depending upon the direction of rotation of the cutting tool 10. The forming or grinding of opposing walls 33 and 34 of the flutes 30 extends from a point or distal from end 22 and proximal the shank portion 11 and may be discontinued at or near the boundary of the body portion 12 and the shank portion 11. It will be appreciated that the direction of the forming or grinding of the flutes 30 may be reversed. As may be seen in the exemplary embodiment of the present disclosure, the cutting tool 10 may include seven flutes 30 forming the milling tool 10, and the seven flutes 30 may wind helically around the body portion 12 of the milling tool 10 and may define the six flute grooves 40. It is possible to have fewer or greater numbers of flutes 30 as may be appropriate for a given application or objective.

In one particular exemplary embodiment of the present disclosure, the flutes 30 may be formed at a helix angle which "winds" around the cylindrical body portion 12 of approximately 30° (thirty degrees) from the longitudinal axis of the cutting tool 10. For a cutting tool 10 as disclosed, a "low helix" (or low helical flute) is a flute 30 that helically "winds" around the body portion or cylinder 12 at an angle of no more than approximately 20° (twenty degrees) from the longitudinal axis of the cutting tool 10. A "high helix" (or high helical flute) is a flute 30 that helically winds around the generally cylinder-shaped body portion 12 at an angle of greater than approximately about 30°. Low helix angle flutes 30 may be typically employed for rough cutting while high helix angle flutes may be typically employed for a finer finish cutting. In one particular exemplary embodiment of the present disclosure, it is believed that a particularly effective milling tool 10 may include flutes 30 formed at a helix angle of between approximately 20° (twenty degrees) and approximately 30° (thirty degrees) from the longitudinal axis of the cutting tool 10.

Referring now in general to FIGS. 1 through 4, the unique flutes 30 of the cutting tool 10 according to the present disclosure are shown in greater detail. Each flute 30 includes a first or leading edge 31 and a second or trailing edge 32 associated with the leading wall 33 and the trailing wall 34 of the cutting tool 10. Each flute 30 may be separated by the flute groove 40 that is formed to include a base surface 41 that is a generally and substantially flat and arcuate surface having a center located on the longitudinal axis of the cutting tool 10. The direction of rotation of the cutting tool 10 is chosen based upon the angular offset of the helical flutes 30 and grooves 40 from the longitudinal axis of the cutting tool 10 so that the chips removed from the foam workpiece follow the flute groove 40 away from the workpiece as the cutting tool 10 rotates. The helix shaped flutes 30 and helix shaped flute grooves 40 of the present embodiment may be angled in an opposite direction from the longitudinal axis of the cutting tool 10 as shown in the Figures.

Each flute 30 further includes a flute surface 50 generally extending from the leading-edge to the trailing edge of the flute 30. Each flute surface 50 further includes a first cutting edge 31 and a second cutting edge 32. The first cutting-edge 31 is generally aligned with one of the leading edge and the trailing edge of the flute 30 and the second cutting edge is generally aligned with the other of the leading edge and the trailing edge of the flute 30. The cutting tool 10 of the present disclosure is a multi-flute helix cutter with dual cutting-edges on the same flute 30 and has particular benefits and efficiencies when used to cut a foam workpiece as best shown in FIG. 3.

Figure 3:
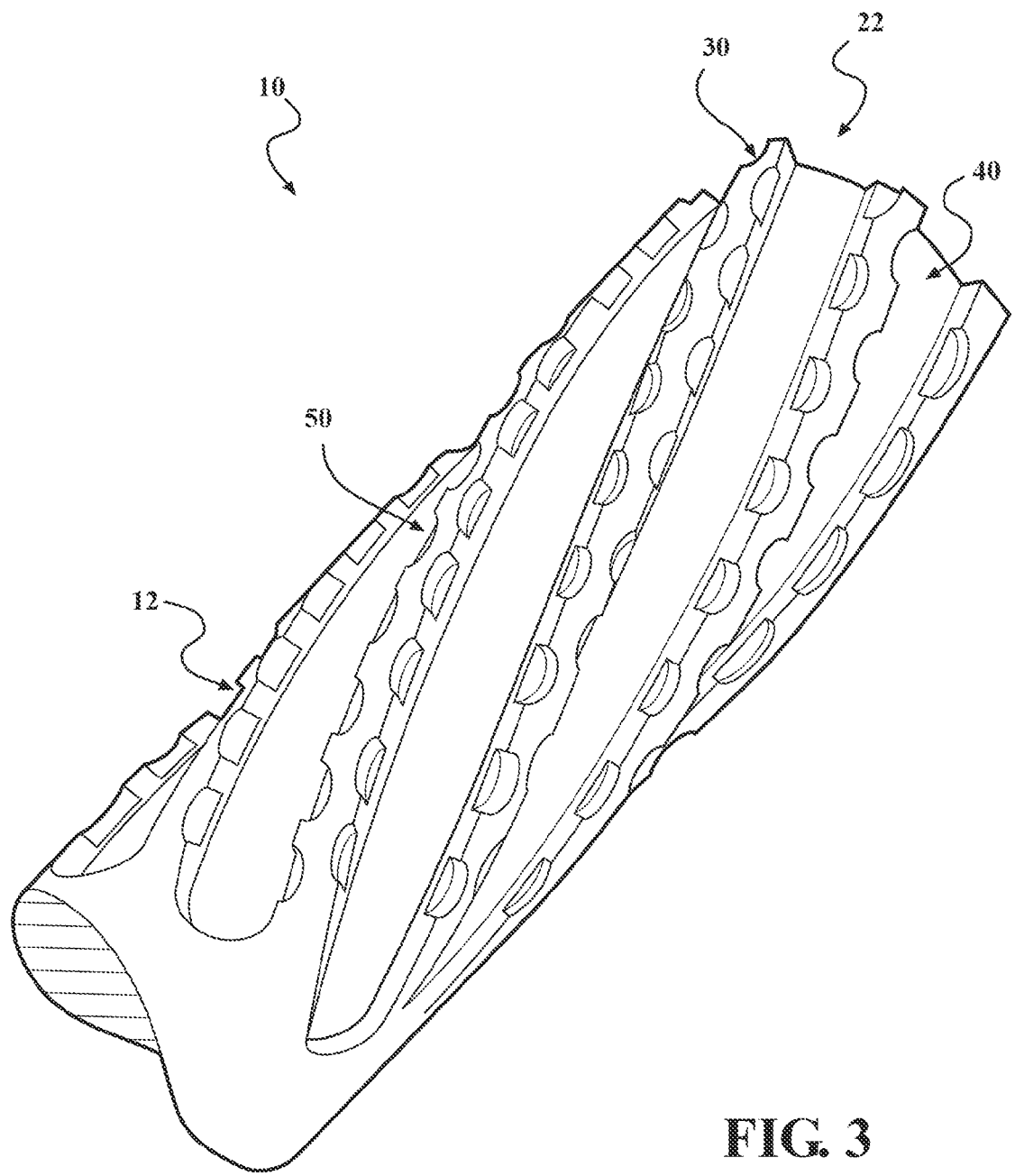
FIG. 3 is a partial, perspective graphic image view of the cutting tool of FIG. 1 showing the detail of the flutes according to the exemplary embodiment of the present disclosure.

More particularly, the cutting tool 10 of the exemplary embodiments of the present disclosure includes a multi-flute helix cutter and having dual cutting-edges on the same flute 30 that is interrupted by offset and has particular benefits and efficiencies when used to cut a foam workpiece as best shown in FIG. 3.

Referring now in particular to FIG. 4, the second or distal end 22 is shown in greater detail. The outline of each flute 30 is also shown in greater detail. In particular, the flutes 30 include and are defined by a leading wall 33 and a trailing wall 34 that may each be angled with respect to a floor 41 of the flute groove 40. In particular, the leading wall 33 of the flute 30 may be angled with respect to the floor 41 of the flute groove 40 at an angle of substantially ninety degrees (90°) from a ray perpendicular to the longitudinal axis of the cutting tool 10. Similarly, the trailing wall 34 of the flute 30 may be angled with respect to the floor 41 of the flute groove 40 at an angle of substantially ninety degrees (90°) from a ray perpendicular to the longitudinal axis of the cutting tool 10.

As shown in FIG. 4, the cutting tool 10 may also include a partially-hollow cross-section defining a passage 35 having a generally round cross-section and that may extend along the longitudinal axis of the cutting tool 10. Typically, the passage 35 will extend along at least a portion, if not the entire, body portion 12 of the cutting tool 10 from the end 22 and toward the shank 11. By having a hollow cutting tool 10, the mass of the cutting tool is 10 is reduced and therefore may require less energy to rotate at a given speed.

In one exemplary embodiment according to the present disclosure, the end of the passage 35 near the end 22 of the cutting tool 10 may, in one exemplary embodiment of the present disclosure, be threaded for receiving at least one of the first and second threaded end cutters 70 and 80 as those shown in FIGS. 5 and 6, respectively. In particular, FIG. 5 discloses an end mill or square foam cutter head 70 that may be threadingly engaged to the threaded passage 35 in the end 22 of the cutting tool 10. FIG. 6 discloses a ball (or hemispherical) nose type foam cutter head 80 that may be similarly designed to be readily engaged to the threads of the passage 35 in end 22 of the cutting tool 10. It should be appreciated that other shapes and sizes of cutter heads may be threaded to the end 22 of the cutting tool 10. Further, it should be appreciated that other types of coupling, connecting or fastening devices or mechanisms may be used for coupling an end mill to the cutting tool 10.

According to an exemplary embodiment of the present disclosure the cutting tool 10, the shank portion 11 and body portion 12 may be formed using any known or appropriate process and/or material, including in one exemplary embodiment, a metal material such as steel or steel alloy. The cutting tool 10 may preferably be formed including the hollow passage 35. The flutes 30 may be formed, produced or machined in the body portion 12 using any known or appropriate process including either removal and/or addition of material to the body portion 12. The flutes 30 may be formed to include the leading wall 33 and trailing wall 34 as well as the leading and trailing cutting edges 31 and 32, respectively, of the flute 30. The flute 30 may further include the generally flute surface 50 located on the distal end of each flute 30 and extending between the leading cutting-edge 31 and the trailing cutting edge 32 of flute 30.

The leading wall 33 and trailing wall 34 of each flute 30 may be machined to have a preferred angle from the normal direction to the longitudinal axis of the cutting tool 10. In one particular exemplary embodiment of the present disclosure, the scallop-shaped or half-round recesses, reliefs or cut-outs 55 may be formed in the surface 50 of each flute 30 using any known or appropriate forming process including a machining or milling. More particularly, in one exemplary embodiment, each relief 55 may be formed in the flute 30 using a drilling procedure appropriate to create the approximately half-round reliefs 55 as shown. A plurality of reliefs 55 may be generally evenly spaced along each leading cutting edge 31 and trailing cutting edge 32 of each flute 30. Each relief 55 may preferably have a uniform depth of approximately one-half (½) in its respective leading wall 33 or trailing wall 34 of the flute 30. Each relief 55 should have more than an insubstantial depth and a depth of less than one hundred percent (100%) of the height of the leading and trailing walls 33 and 34, respectively. More particularly, in one exemplary embodiment according to the present disclosure, each relief 55 may have a depth of between approximately twenty-five percent (25%) and seventy-five percent (75%) of the height of its respective wall. Even more particularly, in one exemplary embodiment according to the present disclosure, each relief 55 may have a depth of approximately 50% of the height of its respective wall of the flute 30. In one particular exemplary embodiment, the walls of the flute 30 may have a height of approximately thirty thousandths (0.030) of an inch and each relief 55 may have a depth of between approximately ten thousandths (0.010) and fifteen thousandths (0.015) of an inch.

In one particular exemplary embodiment according to the present disclosure, as best shown in FIG. 3 the reliefs 55 of the trailing edge 32 of the flute 30 may preferably be offset a predetermined amount from the reliefs 55 of the leading edge 31 of each flute 30. In one particular exemplary embodiment according to the present disclosure, the reliefs 55 of the trailing edge 32 of the flute 30 may preferably be offset fifty percent (50%) so that the center of the reliefs 55 on the trailing edge 32 are evenly spaced between the reliefs 55 of the leading edge 31 of each flute 30.

In one exemplary embodiment of the present disclosure, the reliefs 55 on each flute 30 are located in a staggered from one flute 30 to the next flute 30 such that as the cutting tool 10 rotates, the reliefs 55 of the cutting tool 10 reasonably uniformly cover the entire surface of the workpiece. In particular, the reliefs 55 of a second flute 30 are offset a predetermined amount from the reliefs 55 of a first flute 30 based upon the total number of flutes 30 on the cutting tool 10. More particularly, the centers of the reliefs 55 of the second flute 30 are offset a predetermined amount from the centers of the reliefs 55 of the first flute 30. In one exemplary embodiment of the present disclosure, the cutting tool 10 has a first flute 30 having a first relief 55 having a center at the very end (or zero point) of the flute 30, then the center of the first relief 55 of the next flute 30 will be shifted a predetermined amount equal to the distance between the reliefs 55 on the first flutes 30 divided by the total number of flutes 30. Of course, the predetermined spacing of the reliefs 55 from one flute 30 to another flute 30 in this particular embodiment and design is premised on the reliefs 55 being spaced equidistant along each flute 30. It is contemplated that it is possible to vary the spacing of the reliefs 55 along the flutes 30 of the cutting tool 10 such that the reliefs 55 are staggered to provide a similar effective complete distribution and overlap of the reliefs 55 the length of the cutting portion of the cutting tool 10.

With the reliefs 55 formed in the flutes 30, it can be seen that the reliefs 55 interrupt the cutting-edges 31 and 32 of the flutes 30 and work in conjunction with the remaining portions of the leading and trailing edges 31 and 32, respectively, to provide an improved foam cutting tool 10. Accordingly, forming the reliefs 55 in the flutes 30 causes the cutting-edge to be generally evenly interrupted along the leading and trailing edges 31 and 32, respectively, of each flute 30 during milling of the foam workpiece resulting in a better quality foam cut and produced or finished workpiece thereby saving time, expense and effort because post milling operations are significantly reduced and/or eliminated.

Any numerical values recited herein or in the Figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, (101 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A rotatable cutting tool, comprising:
an elongate body having a longitudinal axis, a proximal end and a distal end;
a first helical flute groove extending over a length of the elongate body, the first helical flute groove having a first end and a second end, the first helical flute groove having a leading wall having an edge and a trailing wall having an edge;
a second helical flute groove extending over a length of the elongate body, the second helical flute groove having a first end and a second end, the second helical flute groove having a leading wall having an edge and a trailing wall having an edge;
the first and second helical flute grooves defining a helical flute having a helical flute surface having a projecting edge; and
wherein the trailing wall of the first helical flute groove is inclined with respect to a floor of the first helical flute groove.

2. The cutting tool of claim 1 wherein the flute is a helical flute having an angle of approximately 30° with respect to the longitudinal axis.

3. The cutting tool of claim 1 further comprising a plurality of reliefs located on the outer surface of the flute.

4. The cutting tool of claim 1 further comprising a plurality of reliefs located in the surface of the flute and wherein the reliefs interrupt at least one of the first and second cutting-edges.

5. The cutting tool of claim 1 further comprising a first plurality of shaped reliefs located along the first cutting edge of the surface of the flute and a second plurality of shaped reliefs located along the second cutting edge of the surface of the flute and wherein the first plurality of shaped reliefs are offset aligned with the second plurality of shaped reliefs.

6. The cutting tool of claim 3 further comprising a first plurality of reliefs located along the first cutting edge of the surface of the flute and a second plurality of reliefs located along the second cutting edge of the surface of the flute and wherein the first plurality of scalloped shaped reliefs are off set aligned with the second plurality of scalloped shaped reliefs.

* * * * *